Patented June 30, 1931

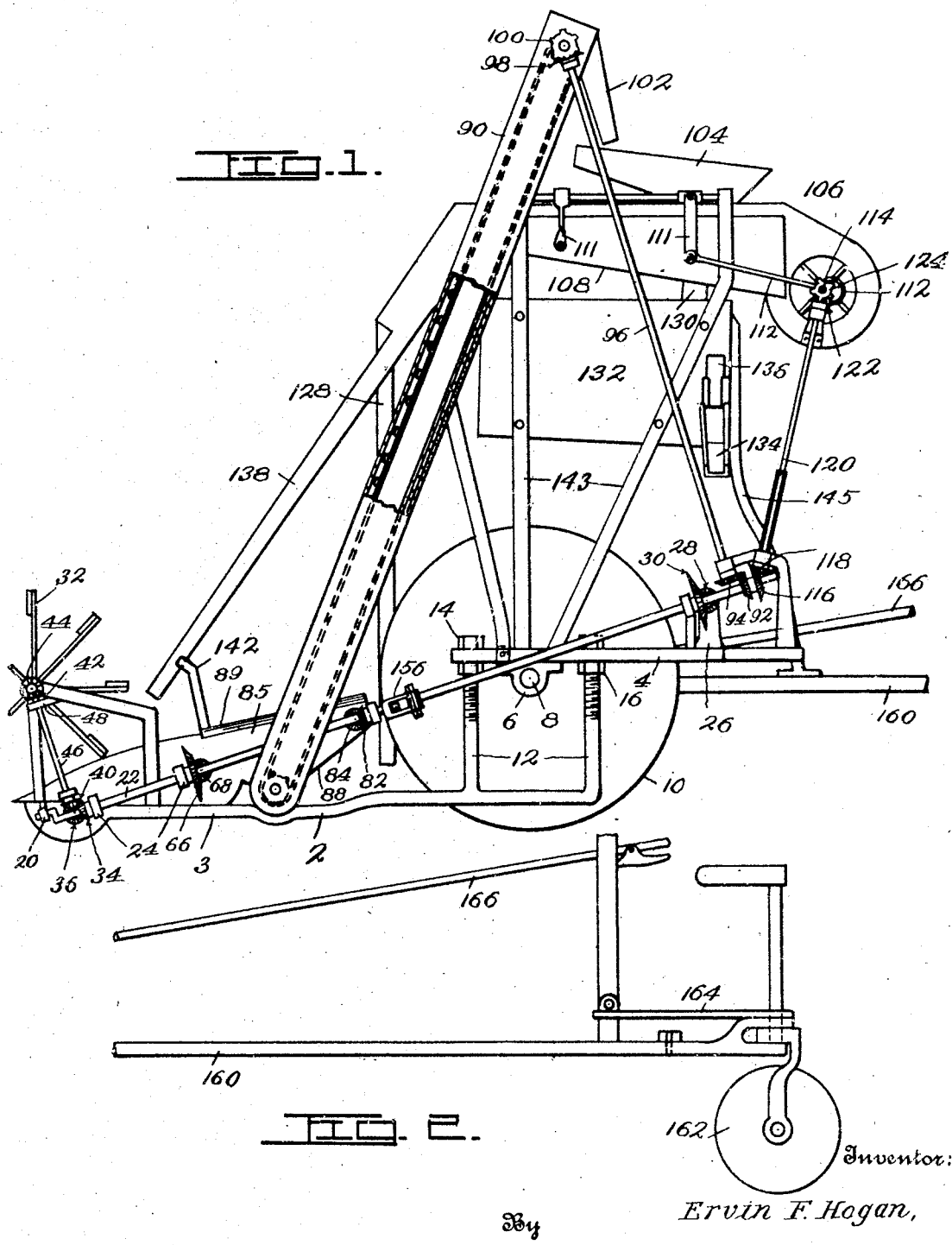

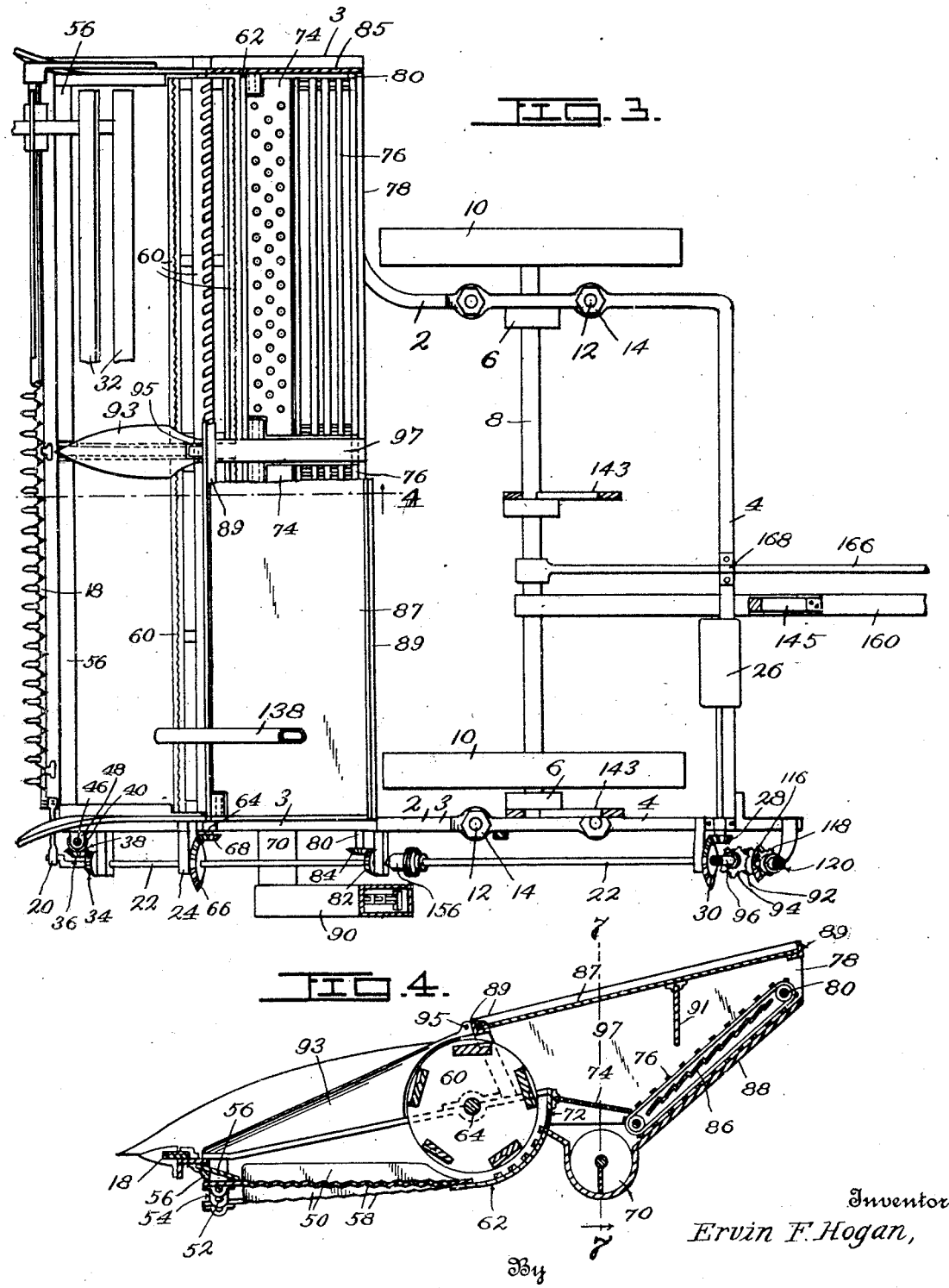

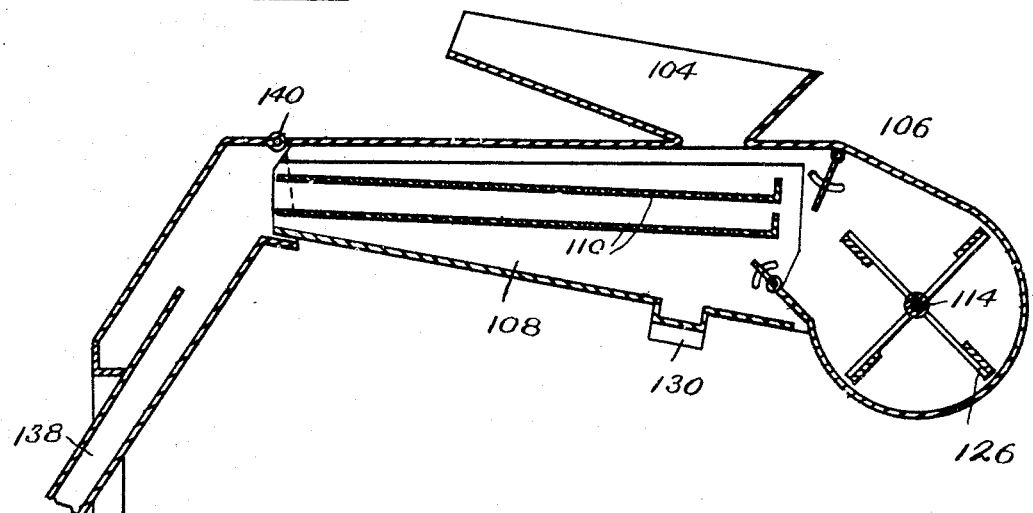
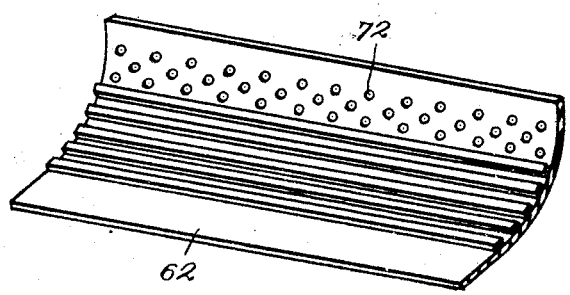
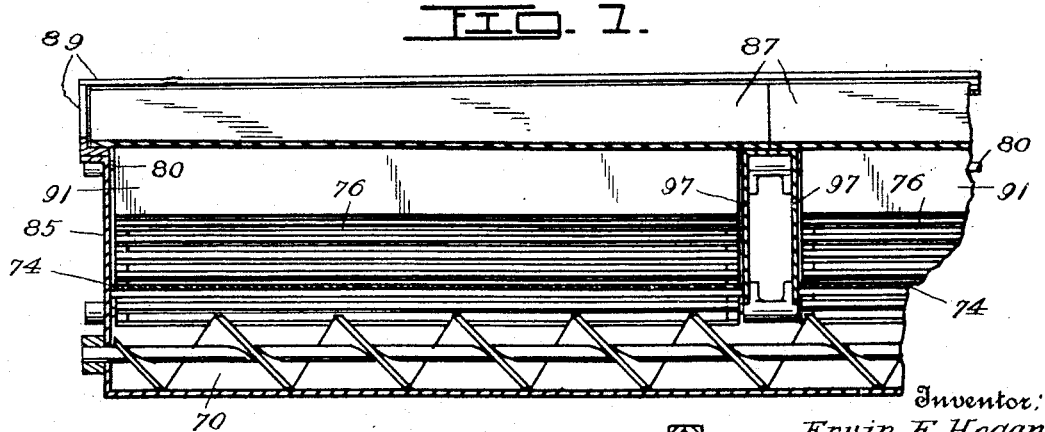
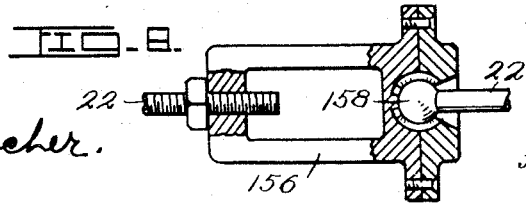

1,812,532

UNITED STATES PATENT OFFICE

ERVIN F. HOGAN, OF BELOIT, KANSAS

COMBINED HARVESTER AND THRASHER

Application filed September 30, 1927. Serial No. 223,052.

My invention relates to combined harvesting and thrashing machines and my object is to provide a simple, efficient and light weight machine of this character which may be controlled by one operator.

A further object is to arrange the different parts of the machine in such manner that after the grain has been cut the straw will be carried head first over a short and relatively straight path of substantially uniform width to the delivery end of the machine from which it is evenly distributed upon the stubble as a fertilizer to the soil.

In the passage of the cut grain towards the delivery end of the machine the kernels of grain are separated from the straw by thrashing mechanism and grain racks which parallel and are located but a short distance in the rear of the cutting mechanism in order to reduce the length of travel of the straw.

The cutting and thrashing mechanisms are preferably of equal length and located close together, so that the numerous long and heavy conveyors heretofore employed for conducting and bunching the grain in front of a narrow thrashing mechanism located a considerable distance from the cutting mechanism, can be dispensed with.

By employing longer thrashing mechanism than usual and feeding the grain thereto in a thin layer greater thrashing efficiency is had, and by having the cut grain and the thrashed straw traverse a short and relatively wide and straight path instead of a long and more or less tortuous one my machine is not required at any time to carry a large amount of grain, or heavy mechanism for handling said grain. Therefore, my machine can be built lighter, will operate on relatively soft ground, and does not require a large crew for operating and keeping the machine in running order.

In order that the invention may be fully understood, reference will now be had to the accompany drawings, in which:

Fig. 1 is a broken side elevation of the forward portion of the machine.

Fig. 2 is a broken side elevation of the rear portion of the machine.

Fig. 3 is a broken plan view partly in section of the forward portion of the machine.

Fig. 4 is an enlarged cross section on line 4 of Fig. 3.

Fig. 5 is a vertical longitudinal section of the grain cleaning mechanism.

Fig. 6 is a broken detail of the concave forming a portion of the thrashing mechanism.

Fig. 7 is an enlarged fragmentary vertical section on line 7—7 of Fig. 4.

Fig. 8 is a detail sectional view of a turn-buckle and portions of two sections of the shaft which are connected to said turn-buckle.

In carrying out the invention I provide a main frame 2 consisting of forward members 3 and a rear U-shaped member 4 provided with boxes 6 mounting an axle 8 upon which a pair of transport wheels 10 are journaled. The front members 3 have upwardly projecting arms 12 which extend through holes in the U-shaped member 4 to permit vertical adjustment of said front members 3. Nuts 14 and 16 are threaded upon the arms 12 and engage the upper and lower surfaces, respectively, of said U-shaped members 4 for holding said arms at any point of their adjustment.

18 designates the cutting mechanism which is mounted upon the forward portions of the members 3. Said cutting mechanism 18 may be of the well-known reciprocatory type and is actuated by a pitman 20 connected to a crank shaft 22 journaled in bearings 24 and driven by suitable means such as a motor 26 through the intermediary of bevel gears 28 and 30. The motor 26 is preferably of the internal combustion type and mounted upon the U-shaped member 4 of the main frame 2.

The standing grain is pressed against the cutting mechanism 18 by suitable means such as a reel 32 which is driven by the crank shaft 22 through the intermediary of bevel gears 34, 36, 38, 40, 42 and 44. The bevel gears 40 and 42 are mounted upon a countershaft 46 journaled in bearings 48. The cut grain is thrown by the reel 32 head first upon a pair of reciprocatory feeders 50. As shown by Fig. 3, the combined length of the feeders 50 about equals the length of the cutting mechanism 18, so that the grain will be carried rearwardly in a comparatively thin but wide layer to the thrashing and separating mechanisms hereinafter described. One end of the feeders 50 are mounted upon and actuated by a crank shaft 52 which is journaled in the main frame 2 and an intermediate bearing 54 and is driven from the crank shaft 22 by the bevel gears 34 and 36. The cut grain is prevented from falling between the rear portion of the cutting mechanism 18 and the forward portions of the feeders 50 by a pair of aprons 56, which are hinged at their forward portions to the underside of said cutting mechanism 18 and have their rear margins resting upon the respective feeders 50.

The bottoms 58 of the feeders 50 are imperforate and corrugated to render them more effective in carrying the cut grain to the thrashing mechanism which consists of a pair of cylinders 60 and a pair of concaves 62, upon the lower forward portions of which latter the rear portions of the feeders 50 slide to and fro. The rear margins of the concaves 62 terminate approximately on a level with the axis of the cylinders 60. The cylinders 60 are fixed upon a shaft 64 which is driven from the crank shaft 22 by bevel gears 66 and 68. As the grain is thrashed from the straw, the major portion of the grain is forced into a conveyor 70 through perforations 72 in the upper rear portions of the concaves 62 and the perforations in a pair of grids 74 extending over said conveyor 70. The conveyer 70 is about the same length as the thrashing mechanism and preferably of the auger type, as shown more clearly by Fig. 7.

The grids 74 are hinged at their forward margins to the rear portions of the concaves 62 and rest at their rear margins upon a pair of rotary straw racks 76 which carry the waste straw upwardly and rearwardly to discharge openings 78, from which the waste straw is discharged evenly upon the stubble. The straw racks 76 are driven by a shaft 80, which in turn is driven by the crank shaft 22 through the intermediary of bevel gears 82 and 84. Any grain passing with the waste straw upon the racks 76 falls through the perforated floor 86 of the latter upon an inclined grain pan 88 which conducts said grain down to the conveyer 70.

The grids 74, the racks 76 and the rear portion of the thrashing mechanism are enclosed in a housing 85 which has the discharge openings 78 in its rear portion and is closed at its bottom by the casing of the conveyer 70 and the grain pan 88. The top of the housing 85 is closed by lids 87 which are hinged to a supplemental frame 89 and provided with depending swingable deflectors 91 which direct the thrashed straw downwardly upon the racks 76 when thrown backwardly by the cylinders 60.

The grain in its passage from the cutting mechanism 18 to the thrashing mechanism is prevented from falling between the feeders 50 and the forward portions of the cylinders 60 by means of a shield 93 which is connected at its upper rear end by a hinge 95 to the supplemental frame 89, so that said shield 93 may be raised to gain access to the adjacent ends of the feeders 50 and the adjacent ends of the aprons 56 for the purpose of inspection and repairs. The thrashed grain in its passage from the thrashing mechanism to the discharge openings 78 is prevented from falling between the rear portions of the cylinders 60, the adjacent ends of the grids 74 and the adjacent ends of the racks 76 by a partition 97 which divides the housing 85 into two compartments.

The conveyer 70 discharges into and is actuated by an elevator 90 which is driven from the crank shaft 22 by gears 92 and 94, a shaft 96, and bevel gears 98 and 100. The upper portion of the elevator 90 is provided with a spout 102 which discharges the grain into the hopper 104 of cleaning mechanism 106 including a reciprocatory shoe 108 carrying superimposed sieves 110, upon the topmost one of which the grain flows from the hopper 104. The shoe 108 is swingably carried by hangers 111 and actuated by an eccentric 112 which is mounted upon a shaft 114 driven from the crank shaft 22 through the intermediary of bevel gears 116 and 118, a telescopic shaft 120 and bevel gears 122 and 124.

The shaft 114 drives a fan 126 which blows the dust and chaff from the grain and discharges it upon the stubble through a spout 128. The cleaned grain passes through the sieves 110 and falls upon the inclined bottom of the shoe 108, from which it is delivered by a spout 130 into a bin 132 provided with a spout 134, through which the cleaned grain may be discharged into a wagon driven beside the machine.

The opening in the bin 132 leading into the discharge spout 134 is controlled by a suitable gate 136 whereby the grain may be retained in the bin 132 until it is ready to be received by the wagon. Any heads and partially thrashed grain are discharged into and conducted by a spout 138 back to the feeders 58 so that it may be rethrashed. As shown by Fig. 5, the spouts 128 and 138 are united at their upper portions and connected by a hinge 140 to the upper stationary portion of the cleaning mechanism 106 so that the lower end of the spout 138 may slide up and down upon a supporting bracket 142 when the latter is raised and lowered upon the forward portion of the frame 2. The cleaning mechanism 106 and the bin 122 are supported upon arms 143 and 145 extending upwardly from the boxes 6 and a pole 160, respectively.

By adjustably connecting the forward portion 3 to the rear portion 4 of the main frame 2, as hereinbefore described, the cutting mechanism 18 may be raised or lowered according to the height at which it is desired to cut the standing grain, and by making the shaft 120 telescopic said shaft will automatically accommodate itself to such adjustments of the main frame. Provision is also made for accommodating the crank shaft 22 to the aforementioned adjustments of the main frame, by making said crank shaft 22 in two sections and threading one end of one of said sections into a turn-buckle 156 and providing a ball-and-socket connection 158 between the other section and said turn-buckle, as shown more clearly by Fig. 8.

A tractor may be hitched in any suitable member to the stubbleward side of the machine to advance the latter, or if a team is employed for that purpose it is hitched to the pole 160, which extends rearwardly from the axle 8 and is provided at its rear end with a tiller 162 which may be controlled by a driver standing upon a platform 164, who is also within easy reach of a lever 166 pivotally mounted at its forward end upon the axle 6 and connected to the U-shaped member 4 of the frame 2 by a suitable fastening device 168. By forcing the rear end of the lever 166 downwardly the main frame 2 is caused to rock around the axis of the shaft 8 and lift the cutting mechanism 18 from the ground to the desired elevation at which the grain is to be cut, and by moving the lever 166 in a reverse direction the cutting mechanism 18 may be lowered close to or until the forward portion of the main frame 2 rests upon the ground.

By making the cutting, feeding, thrashing and grain rack mechanisms of approximately equal length as shown by Fig. 3, the grain is cut in a wide swath and passed rearwardly in a wide and thin layer so that the kernels can be separated from the straw more readily than when the grain is bunched and crowded into thrashing mechanism which is much shorter than the cutting mechanism, and by arranging the different mechanisms close together the necessity for long conveyors for handling the grain are dispensed with.

From the foregoing description it is apparent that I have provided a machine of durable but light and simple construction which is capable of harvesting and thrashing a large amount of grain, and while I have shown one form of the invention I reserve all rights to such changes and modifications thereto as properly fall within the spirit and scope of the invention as claimed.

Having thus described my invention, what I claim and desire to secure by Letters Patent is:

1. In a combined harvester and thrasher having a frame and cutting mechanism disposed transversely at the forward portion of said frame, thrashing mechanism of approximately equal length to said cutting mechanism and located close to the rear of the latter, a conveyor arranged at the rear of said thrashing mechanism, an upwardly and rearwardly inclined rack arranged at the rear of said conveyor and adapted to discharge the straw from the machine, a deflector swingably mounted above said rack, and an inclined grain pan arranged beneath the rack and sloping downwardly to the conveyor.

2. In a combined harvester and thrasher having a frame and cutting mechanism mounted upon said frame, thrashing mechanism paralleling and located close to the rear of said cutting mechanism, reciprocatory feeding mechanism for conducting the grain from the cutting mechanism to said thrashing mechanism, aprons operably connected at their forward portions to the cutting mechanism and freely supported at their rear portions upon said feeding mechanism, means for collecting the grain thrashed from the straw, and means for discharging the straw from the machine.

3. In a combined harvester and thrasher having a frame and cutting mechanism mounted upon said frame, thrashing mechanism paralleling and located close to the rear of said cutting mechanism, means for collecting the grain thrashed from the straw, means for discharging the straw from the machine, grain cleaning mechanism, mechanism for conducting the thrashed grain from the grain collecting means to said cleaning mechanism, means for separating the partially cleaned grain from the cleaned grain, and spout means for conducting the partially cleaned grain back to the thrashing mechanism for rethrashing.

4. In a combined harvester and thrasher having a frame and cutting mechanism mounted upon said frame, thrashing mechanism paralleling and located close to the rear of said cutting mechanism, a grid paralleling and located adjacent to the rear portion of said thrashing mechanism, an auger arranged beneath said grid, grain cleaning mechanism, and an elevator for delivering the thrashed grain from the auger to said cleaning mechanism.

5. In a combined harvester and thrasher, a frame, cutting mechanism mounted upon said frame, thrashing mechanism paralleling and located close to the rear of said cutting mechanism, reciprocatory feeding mechanism having imperforate corrugated bottom portions for carrying the grain from the cutting mechanism to said thrashing mechanism, and a driven crank shaft for actuating said feeding mechanism.

6. In a combined harvester and thrasher, cutting mechanism disposed at the forward portion thereof, thrashing mechanism paralleling and located close to the rear of said cutting mechanism, reciprocatory feeding mechanism for carrying the grain from the cutting mechanism, to said thrashing mechanism, and an apron operably connected to the cutting mechanism and overlapping the adjacent portion of said feeding mechanism.

7. In a combined harvester and thrasher having cutting mechanism at the forward portion thereof, thrashing mechanism paralleling and located close to the rear of said cutting mechanism, a rack located close to the rear of said thrashing mechanism, a grid hinged to the thrashing mechanism and overlapping the adjacent portion of said rack, and a conveyor underlying said grid and paralleling the thrashing mechanism.

8. In a combined harvester and thrasher having cutting mechanism at the forward portion thereof, thrashing mechanism paralleling and located close to the rear of said cutting mechanism and consisting of a rotary cylinder and a stationary concave the rear portion of which terminates approximately on a level with the axis of said cylinder and is provided with perforations, a rack spaced a short distance to the rear of said thrashing mechanism, a grid hinged to the rear portion of said concave at a point above the perforations and overlapping the adjacent portion of said rack, a conveyer underlying said grid and the perforations in the concave and paralleling the thrashing mechanism, and a housing enclosing the grid, the rack and the conveyer and provided with a discharge opening.

9. In a combined harvester and thrasher having cutting mechanism therefor, a pair of alined cylinders paralleling and located close to the rear of said cutting mechanism, a pair of alined concaves paralleling and located adjacent to said cylinders, a pair of reciprocatory feeders operably connected to the cutting mechanism and freely supported at their rear ends upon the lower forward portions of said concaves, and a shield extending from the cutting mechanism to a point above said cylinders and overlapping the adjacent ends of the latter and the ends of said feeders.

10. In a combined harvester and thrasher having cutting mechanism therefor, thrashing mechanism paralleling and located close to the rear of said cutting mechanism, a rack located close to the rear of said thrashing mechanism, a housing enclosing said rack and the rear portion of the thrashing mechanism, and a deflector swingably depending from the inner upper portion of said housing.

11. In a combined harvester and thrasher, cutting mechanism at the forward portion thereof, a pair of alined cylinders paralleling and arranged close to the rear of said cutting mechanism, a pair of alined concaves paralleling and located close to said cylinders, a pair of alined feeders arranged between the cutting mechanism and said concaves, a shield extending from the cutting mechanism to a point above the cylinders and overlapping the adjacent ends of the latter and the adjacent ends of said feeders, and hinge means operably connecting the rear end of said shield to the frame of the machine.

In testimony whereof I affix my signature.

ERVIN F. HOGAN.